United States Patent [19]

Lewan et al.

[11] Patent Number: 5,015,378
[45] Date of Patent: May 14, 1991

[54] BELT OIL SKIMMER APPARATUS

[75] Inventors: Philip C. Lewan; Robert G. Podlesak; Kenneth L. Buchner, all of Jackson, Mich.

[73] Assignee: Camshaft Machine Company, Jackson, Mich.

[21] Appl. No.: 469,352

[22] Filed: Jan. 24, 1990

[51] Int. Cl.$^5$ .................. B01D 17/02; C02F 1/40
[52] U.S. Cl. ..................... 210/386; 210/241; 210/396; 210/400; 210/526; 210/923; 210/924
[58] Field of Search ............ 210/172, 241, 242.3, 210/242.4, 244, 386, 396, 400, 407, 523, 526, 923, 924, 776, 783

[56] References Cited

U.S. PATENT DOCUMENTS

| | | |
|---|---|---|
| 3,314,545 | 4/1967 | Grabbe et al. .................. 210/242.3 |
| 3,508,663 | 4/1970 | Brill .................................. 210/396 |
| 3,640,394 | 2/1972 | Brill et al. ........................ 210/322 |
| 3,643,804 | 2/1972 | Sharpton .......................... 210/526 |
| 3,695,451 | 10/1972 | Schmidt, Jr. et al. ............ 210/526 |
| 3,709,369 | 1/1973 | Brill et al. ........................ 210/400 |
| 3,947,360 | 3/1976 | Fast .................................. 210/526 |
| 3,968,041 | 7/1976 | De Voss ........................... 210/923 |
| 3,992,292 | 11/1976 | Grimes et al. .................... 210/693 |
| 4,089,784 | 5/1978 | Ettelt et al. ...................... 210/526 |
| 4,154,683 | 5/1979 | Timmer et al. .................. 210/238 |
| 4,274,957 | 6/1981 | Koller .............................. 210/172 |
| 4,582,604 | 4/1986 | Bashaw ............................ 210/396 |
| 4,652,372 | 3/1987 | Threadgill ...................... 210/242.3 |
| 4,876,011 | 10/1989 | Betts et al. ...................... 210/924 |

FOREIGN PATENT DOCUMENTS 1604844 12/1981 United Kingdom .............. 210/923

*Primary Examiner*—James C. Housel
*Attorney, Agent, or Firm*—Beaman & Beaman

[57] ABSTRACT

Apparatus for removing oil from the surface of a liquid using an endless belt partially submerged in the liquid, the belt passes over a primary roller having a vertical axis and pressure rollers squeeze the belt on the primary roller removing oil from the belt which flows by gravity to a collection receptacle mounted upon a frame supporting the primary roller and its drive structure. The belt twists whereby its lower portion submerged in the liquid defines a reversing loop whose configuration is maintained by a weight roller having a horizontal axis of rotation.

17 Claims, 2 Drawing Sheets

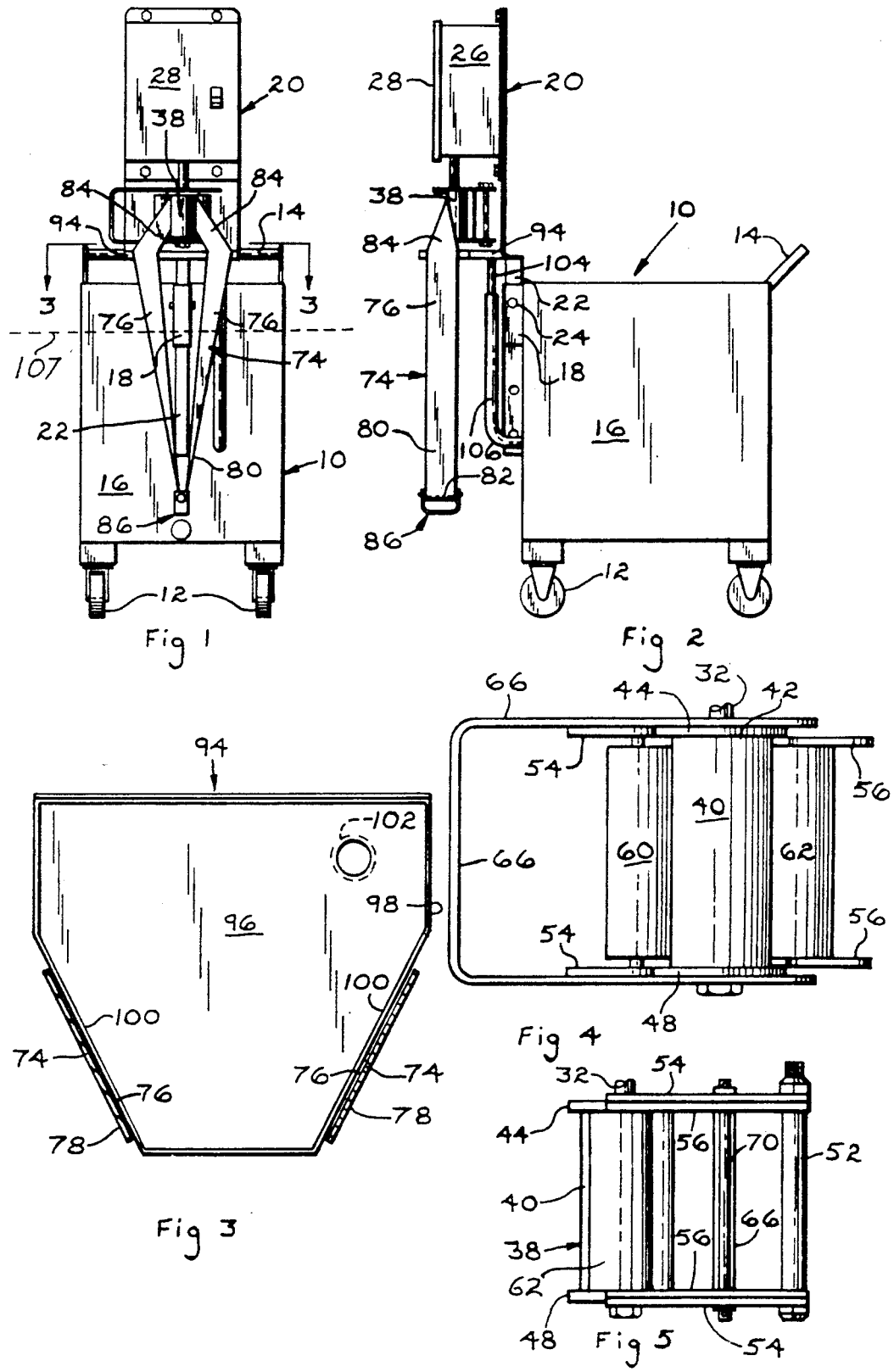

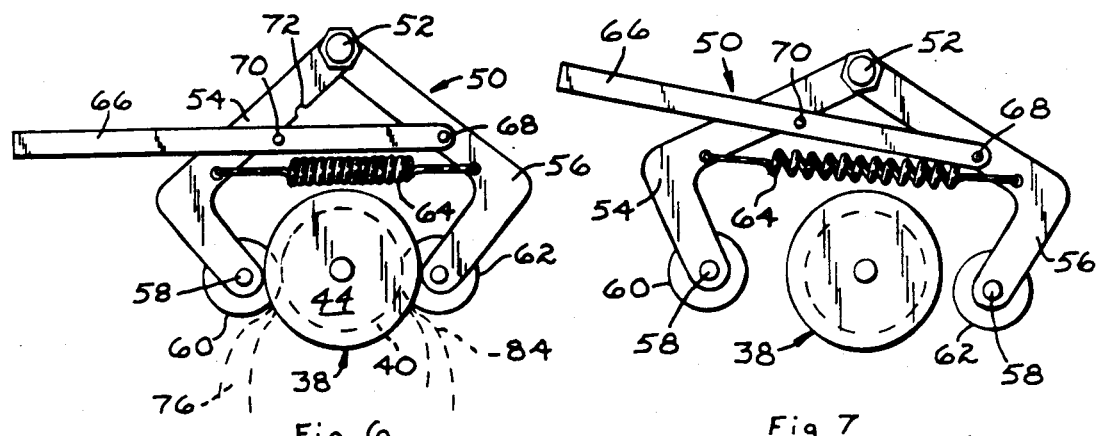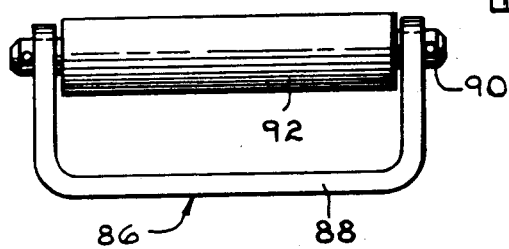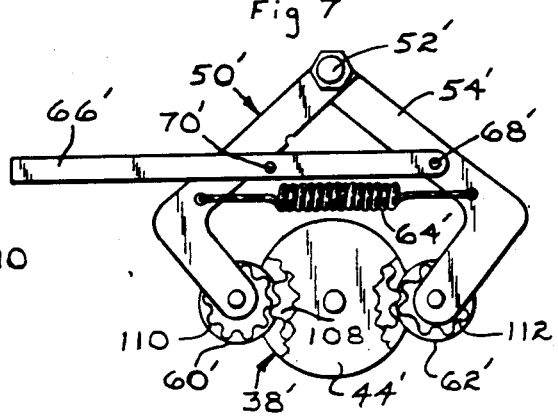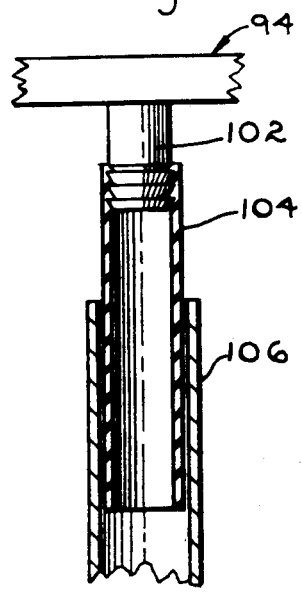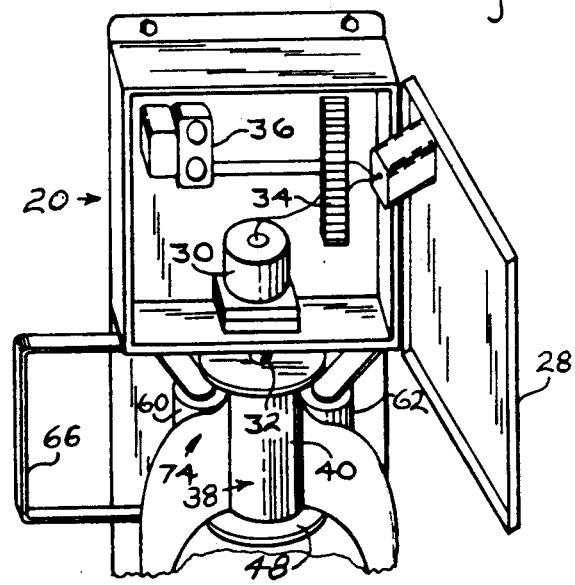

BELT OIL SKIMMER APPARATUS

BACKGROUND OF THE INVENTION

As oil is lighter than water skimming devices for separating oil from a heavier body of liquid, such as water, are available for collecting and removing the surface oil from the body of liquid. Such devices are commonly used to recover oil from machine tool coolants, and may also be employed to recover tramp oil and remove oil from large bodies of water as occurs during an oil spill.

It has been discovered that oil and similar floating material can be removed from the surface of a body of water by the use of an endless belt, web, or rope which passes through the liquid surface wherein the oil will adhere to the rising belt or rope and can be removed therefrom by scraping or squeezing actions. United States patents disclosing oil separating devices of the endless belt or web type are shown in U.S. Pat. Nos. 3,314,545; 3,508,663; 3,640,394; 3,709,369; 4,154,683; 4,274,957; 4,652,372 and 4,582,604. The devices shown in these patents employ pressure rollers or scrapers to remove the oil from the belt or web, and while the prior art devices are capable of collecting oil from the surface of a liquid the efficiency of operation is low, and problems are encountered in effectively removing the oil from the belt or strand and collecting the same without reintroducing a significant amount of oil back into the body of liquid being treated.

Flexible belt, web and strand oil skimmers have the advantage over oil removers utilizing rotating discs which are partially submerged in the liquid in that the flexibility of belts and strands permits the apparatus to be relatively concise in configuration and adaptable to various configurations of installation, particularly with respect to accommodating machine tool configurations when removing oil from cutting tool coolants. However, belt and strand skimmers using doctor and scraper blades to remove the oil from the moving belt or web wear the belt requiring frequent belt and blade replacement, and such devices require frequent maintenance attention for efficient operation.

Belt, web and strand skimmers utilizing the pressure of rollers to squeeze the oil from the belt do not wear the belt to the extent of a scraper blade, but the use of rollers creates a "puddle" at the entrance of the belt into the rollers and as such roller type skimmers employ horizontally disposed rollers it is difficult to dissipate or drain off the puddle efficiently which causes a relatively high percentage of oil to remain on the belt adversely affecting the efficiency of the apparatus.

It is an object of the invention to provide apparatus of the oil removing or skimming type utilizing a flat belt or web by removing the oil from the belt by rollers and yet the oil removed by the rollers is quickly drained from the location of oil removal to produce high efficiency oil removal.

A further object of the invention is to provide oil skimming apparatus of the endless belt type wherein minimum belt wear occurs while high oil removal efficiencies are obtained in apparatus which requires a minimum of maintenance and servicing.

Another object of the invention is to provide oil skimming apparatus of the endless belt type wherein oil is removed from the belt by rollers and the rollers are substantially vertically oriented wherein the oil removed from the belt quickly falls under gravitational force away from the belt and roller.

An additional object of the invention is to provide oil skimming apparatus of a concise configuration which may take a portable form and may be readily employed in a wide variety of installations, and is particularly suitable for removing oil from the coolant of machine tools.

A further object of the invention is to provide oil skimming apparatus of concise configuration wherein the operating components may be readily vertically adjusted relative to a portable reservoir for collecting the removed oil.

Another object of the invention is to provide oil skimming apparatus of the endless belt type wherein removal and installation of the belt is readily accomplished requiring no special skill on the part of the operator.

The apparatus of the invention includes a frame which may be associated with an oil receiving reservoir. The frame includes a housing vertically mounted upon and adjustable above the reservoir and the housing supports an electrical motor driven primary cylindrical roller having a vertically oriented axis of rotation. The lower end of the roller is free and unsupported whereby an endless belt may be readily slipped under the roller and passed thereabout.

A plurality of pressure rollers having axes of rotation parallel to the vertical primary roller axis are located upon opposite sides of the primary roller and are biased by springs toward the primary roller maintaining the belt thereon and compressing the belt to the primary roller.

The belt is of such length that its lower portion extends below the primary roller and naturally twists to define a reversing loop at its lowermost portion having a horizontal axis defining the reversal of direction of the belt. A weight roller is preferably located in the belt reversing loop to help maintain the belt taut. The lower belt portion is submerged in the body of liquid being treated and as the belt moves upwardly through the surface of the body oil on the body surface will adhere to the belt and be removed by the compression of the belt between the primary roller and the pressure rollers.

A collection receptacle is located directly below the primary and pressure rollers receiving the oil removed from the belt. The collection receptacle includes an outlet in communication with the reservoir and as the frame housing and its associated components are vertically adjustable relative to the reservoir the conduit connection between the receptacle and reservoir telescopes to accommodate the vertical position of the receptacle.

Preferably, the motor circuit includes a timer and other controls wherein the operation of the apparatus may be regulated so that the oil removing procedure need occur no longer than necessary to accommodate a particular situation thereby achieving maximum belt life and efficiency of power consumption.

As the axes of rotation of the primary and pressure rollers are vertical, the "puddle" of oil that occurs as the belt enters the primary and initial pressure rollers is quickly drained away by gravity into the collection receptacle, and the use of two pressure rollers, both being vertically oriented, quickly removes a very high percentage of the oil from the belt minimizing the amount of oil adhering to the belt for reintroduction into the liquid and producing a very high efficiency of operation.

No guide rollers are necessary to achieve the twisting of the belt which occurs between the primary and weight rollers, and the apparatus of the invention produces a minimum of belt wear assuring low maintenance and a low cost of operation.

BRIEF DESCRIPTION OF THE DRAWINGS

The aforementioned objects and advantages of the invention will be appreciated from the following description and accompanying drawing wherein:

FIG. 1 is a front elevational view of oil skimming apparatus in accord with the invention, FIG. 2 is a side elevation view of the apparatus of FIG. 1 as taken from the right thereof, FIG. 3 is a plan view of the oil collection receptacle as taken along Section 3—3 of FIG. 1, FIG. 4 is a front elevational detail view of the pressure roller support and rollers, FIG. 5 is a side elevational detail view of the pressure roller support as taken from the right of FIG. 4, FIG. 6 is a schematic plan view of the roller support apparatus and rollers illustrating the pressure rollers in the operative oil removing position, FIG. 7 is a view similar to FIG. 6 illustrating the pressure rollers removed from the primary roller as occurs during belt replacement, FIG. 8 is an elevational view of the weight roller, per se, FIG. 9 is an elevational, sectional detail view of the collection receptacle outlet and telescoping conduits, FIG. 10 is a perspective view of the frame housing, cabinet and roller components, and FIG. 11 is a view similar to FIG. 6 illustrating a modification of roller construction utilizing gears.

BRIEF DESCRIPTION OF THE PREFERRED EMBODIMENT

The overall arrangements of the components of oil removing apparatus in accord with the invention is best appreciated from FIGS. 1 and 2 wherein a portable version of the apparatus of the invention is disclosed. The disclosed apparatus includes a frame generally indicated at 10 which is mounted on wheels and casters 12 so as to be portable and a handle 14 is mounted on the frame to aid positioning of the frame adjacent to the machine tool or other apparatus containing the body of liquid from which oil is to be removed. Often, the apparatus is employed in the removal of oil from the surface of machine tool cutting coolant, which is a water base liquid.

A reservoir 16 constitutes a portion of the frame 10 and a bracket 18 is fixed upon the reservoir in a vertical orientation. The bracket 18 comprises a vertically oriented channel or groove which supports the frame housing 20 at a location above the reservoir and a slide bracket 22 depending below the frame housing is received within the bracket 18 and the vertical position of the frame housing is determined by the alignment of holes defined in the bracket 18 and slide bracket 22 wherein upon alignment of the holes a pin 24 is inserted therethrough for affixing the frame housing 20 at the desired vertical orientation relative to the reservoir. Such vertical adjustment is made to accommodate the dimensions of the apparatus containing the particular body of liquid being treated.

A cabinet 26 is mounted upon the frame housing 20 and access thereto is through the hinged door 28. The cabinet 26 encloses the electric motor 30 and step-down transmission mounted in the lower region of the cabinet and the motor 30 and transmission include a vertically oriented downwardly extending drive shaft 32 which extends from the bottom of the cabinet. The cabinet also contains the motor control circuit 34 which includes adjustable timer apparatus which may be set to control the frequency and duration of the motor operation.

The primary roller 38 is supported upon the lower end of the shaft 32, and as will be appreciated from the drawings, the roller 38 is of an elongated configuration having a substantially cylindrical circumference or periphery 40. The roller includes an upper end 42 upon which a flange 44 is mounted and the flange has a diameter slightly larger than the diameter of the circumference 40. The roller lower end is indicated at 46 and an enlarged diameter flange 48 is attached to the roller at the lower end. The flanges 44 and 48 assure that the endless belt will be properly located and retained on the roller 38, and the pressure rollers are received between the flanges 44 and 48 as will be later apparent.

The pressure roller support 50 is mounted on the frame housing 20 below the cabinet 26 and adjacent the pressure roller 38. The pressure roller support 50 includes a vertically oriented shaft 52 which constitutes a pivot for the left pair of bell crank levers 54 and the right pair of bell crank levers 56 as viewed in FIGS. 4, 6 and 7. Levers 54 and 56 are located adjacent both the upper and lower ends of the roller 38, as will be appreciated from FIG. 4, and the levers are pivotally mounted upon the shaft 52 at their inner end, and the outer ends of the levers each include a pivot shaft 58. The elongated pressure roller 60 is mounted upon the shaft 58 of the levers 54, while the elongated pressure roller 62 is mounted upon the pivot shaft 58 of the levers 56.

The pressure rollers 60 and 62 are of a diameter less than that of primary roller 38, and the length of the pressure rollers is substantially equal to that of the circumference 40 wherein the rollers 60 and 62 are capable of directly engaging the circumference 40 intermediate the flanges 44 and 48.

The pressure rollers 60 and 62 are biased toward the pressure roller 38 by a pair of springs 64 interposed between the upper levers 54 and 56 and the lower levers 54 and 56.

A U-shaped operating lever 66 is interposed between the lever pairs 54 and 56 and the outer ends of the legs of the lever 66 are pivotally mounted upon levers 56 by a pivot 68. A shaft 70 is also mounted upon the operating lever 66 extending between the legs thereof and the shaft 70 is adapted to be received within the notch 72 defined within the inner surface of the levers 54, FIG. 6.

Under normal operating conditions the primary roller 38, the pressure rollers 60 and 62, and the lever sets 54 and 56 will be as shown in FIG. 4. The springs 64 will be biasing the rollers 60 and 62 toward the primary roller 38, against the outer surface of the endless belt, the belt being shown in dotted lines, and the shaft 70 will be out of alignment with the notch 72 as apparent in FIG. 6.

When it is desired to remove the endless belt and install a new one the operating lever 66 is rotated in a clockwise direction as shown in FIG. 7, about the pivot 68, which causes the shaft 70 to bear against the inside linear surface of the levers 54 causing the opposed levers 54 and 56 to spread apart and move away from the roller 38, FIG. 7. Upon the shaft 70 being received within the notch 72 the levers 54 and 56 will lock in this "open" position wherein the rollers 60 and 62 are sufficiently removed from the circumference of the roller 38 to permit the endless belt to be removed from the roller and pass around the lower flange 48, and a new belt may be easily slipped under the flange 48 and up and on the roller 38 for location upon the roller 38. Thereupon, the operating lever 66 is rotated in a counterclockwise direction, FIG. 7 removing the shaft 70 from the notch 72 and permitting the levers 54 and 56 to be pulled toward each other by the springs 64 to reassume the normal operating position shown in FIG. 6.

The endless belt 74 is the component which removes the oil from the body of liquid being treated. The belt constitutes a web formed of a material to which oil has an affinity and will adhere thereto. The belt 74 may be formed of a variety of materials which are well known in the art for use with oil skimming devices. Such belts are flexible enough to pass around the roller 38, but have a relatively stiff resistance to bending in the general plane of the belt material.

The endless belt 74 includes and "inner" side 76 and an "outer" side 78. The length of the belt is such that the belt lower portion 80 extends substantially below the frame housing 20, and the weight of the belt, alone, is sufficient to cause the belt to hang in the manner illustrated in FIGS. 1 and 2. The lower end of the belt defines a reversing loop 82 which naturally forms an axis of reversing which is substantially horizontal, and as the upper end of the belt passing around the roller 38 defines a reversing configuration having a vertical axis a twist occurs in the two portions of the belt at 84. The twist at 84 naturally results from the vertical orientation of the upper portion of the belt and the horizontal orientation of the reversing loop at lower portion 80.

The desired configuration of the endless belt 74 is as shown in FIGS. 1 and 2 wherein the lower portion 80 will be submerged in the liquid being treated, and while the reversing loop 82 will naturally occur it is desirable to add weight to the lower portion 80 and the weight roller 86 is used for this purpose.

The weight roller 86 is received within the belt loop 82 and its construction is best appreciated from FIG. 8. The weight roller includes a U-shaped bracket 88 having a base and legs, and holes defined in the end of the legs receive the removable shaft 90 extending through the roller 92 rotatably mounted on the shaft 90. By removing the shaft 90 from the bracket holes the weight roller 86 may be readily mounted in the belt loop 82 wherein the lowermost portion of the belt passe under the roller 92 intermediate the roller 92 and the base of the bracket 88. The weight of the weight roller 86 tends to tension the belt lower portion 80 assuring that the belt will have a configuration as apparent from FIGS. 1 and 2 as to be readily received within the body of liquid being treated and will maintain a concise controlled configuration maintaining the belt portion 80 submerged and below the surface of the liquid.

The oil being removed from the belt by the rollers 38, 60 and 62 is deposited by gravity upon a collection receptacle 94 located upon the frame housing 20 below the rollers. The configuration of the receptacle 94 is best appreciated from FIG. 3. The receptacle includes a bottom panel 96 and upstanding sidewalls 98. The sidewalls 100 are angled to accommodate the configuration of the belt 74 as it extends past the receptacle, and the belt does not engage the receptacle sides 100 as it moves upwardly and downwardly therepast.

The oil collected in the receptacle 94 passes through an outlet adapter 102 communicating with the bottom panel. The adapter 102 is of a cylindrical configuration having conventional ribs whereby a hose 104 may be slipped upon the adapter for extension in downward direction. The hose 104 is telescopically received within a tube 106 mounted upon and communicating with the reservoir 16 such that oil draining from the receptacle 94 passes into the reservoir 16, and the telescoping relationship between the hose 104 and the conduit 106 maintains communication between the receptacle and the reservoir regardless of the vertical adjustment of the frame housing 20.

If the primary roller 38 is rotating in a clockwise direction as viewed in FIGS. 6 and 7, the left portion of the belt 74 as viewed in FIGS. 1, 2, 6 and 7 will be moving in an upward direction, while the righthand belt portion will be moving downwardly into the liquid to be treated, the surface of such liquid being represented by dotted line 107. As the belt enters the space between the primary roller circumference 40 and the pressure roller 60 the pressure roller 60 will engage the belt side 78 in a biasing manner forcing the belt side 76 into engagement with the primary roller circumference 40. This tight relationship between the primary and pressure rollers with the sides of the belt squeezes the oil adhering to both belt sides from the belt causing a puddle immediately adjacent the respective rollers and belt. This puddle will be of a length equal to the width of the belt, but because of the vertical orientation of the axes of rotation of rollers 38 and 60 the puddles quickly vertically drain under gravitational forces into the collection receptacle 94 located below the rollers, and because of the vertical orientation of the rollers very effective oil removal from the belt surface is achieved.

The pressure roller 62 will assure that the portion of the belt 74 passing "behind" roller 38 firmly engages the roller so as to create the necessary friction to produce the belt movement, and additionally, the roller 62 will squeeze any oil remaining on the belt not removed by the roller 60 which also quickly drains into the receptacle 94.

Endless belt type oil skimmers using rollers horizontally oriented are not capable of removing the "puddle" as quickly as the apparatus of the invention, and the vertical orientation of the roller axes of the invention produces a very high belt cleaning efficiency.

In some installations, wherein the body of liquid being treated is located a significant distance below the roller 38, for instance in a submerged tank, and where an unusually long belt is required sufficient frictional engagement between the belt and the primary drive roller 38 may not exist to assure consistent and uniform belt movement. In such instance where a greater belt driving capacity is required apparatus in accord with that shown in FIG. 11 may be employed.

In FIG. 11 the support for the pressure rollers is identical to that previously described, and the construction of the primary roller is substantially the same as previously discussed, and in FIG. 11 components identical to those previously described are represented by primed reference numerals.

To increase the belt driving efficiency the embodiment of FIG. 11 mounts a gear 108 upon the primary roller 38' on the roller immediately below the flange 44' for rotation with the roller. At its upper end, the pressure roller 60' includes a gear 110, and the pressure roller 62' includes the gear 112. When the pressure rollers are in their normal operative relationship to the primary roller 38' the gears 110 and 112 mesh with the power driven gear 108 and the gears 60' and 62' now become secondary drive rollers rather than idling as in the previously described embodiment. Such positive driving of the rollers 60' and 62' provides greater belt driving friction and permits the oil skimming apparatus to employ a longer belt than usually employed.

From the above description it will be appreciated that oil skimming apparatus in accord with the inventive concepts produces high efficient oil removal from a body of liquid which is relatively economical to manufacture, concise in configuration to permit use with machine tools and the like, and yet can be received and maintained without special skills.

In the disclosed embodiment the frame housing 20 and its associated components are disclosed as being mounted upon a frame which includes the reservoir 16, and the reservoir is mounted upon wheels and casters 12 wherein the disclosed embodiment is portable and may be moved to the location desired, such as a specific machine tool. It is also to be appreciated that the frame housing 20 may be supported on other structure than a portable reservoir. For instance, in many installations in which the inventive concepts are to be employed the frame housing 20 may be directly mounted upon the upper edge of a container or receptacle in which the body of liquid to be treated is confined. In such instance the frame housing 20 may or may not be mounted for vertical adjustment, but as the belt 74 depends downwardly it will be submerged in the liquid from which oil is being removed. With this type of installation the hose 104 draining oil from the collection receptacle 94 will drain into a reservoir separate than the support for the frame housing 20, for instance, the hose 104 may be placed within an oil drum sitting adjacent the container for the body of liquid being treated. In such an installation the oil skimming apparatus of the invention is not portable, but is mounted in a permanent manner, but the oil removing components will operate in the manner described.

It is appreciated that various modifications to the inventive concepts may be apparent to those skilled in the art without departing from the spirit and scope of the invention.

We claim:

1. Apparatus for removing oil from the horizontal surface of a body of liquid comprising, in combination, a frame adapted to be supported adjacent the body of liquid from which oil is to be removed, a primary elongated roller rotatably mounted on said frame for rotation about an axis inclined relative to the horizontal, said roller having an outer surface adapted to receive a substantially flat belt, a substantially flat endless belt having first and second sides, said belt first side engaging said roller, at least one pressure roller rotatably mounted on said frame having an axis of rotation adjacent said primary roller and engaging said belt second side and maintaining said belt first side in engagement with said primary roller, a motor mounted on said frame operatively connected to at least one of said rollers for rotating said rollers about their axes of rotation, and a collection receptacle mounted on said frame below said rollers receiving oil removed from said belt by said rollers, said belt depending below said primary roller and below said receptacle into the body of liquid from whose surface oil is to be removed.

2. In apparatus as in claim 1, said axis of rotation of said primary roller being substantially vertically oriented.

3. In apparatus as in claim 1, said axes of rotation of said primary and pressure rollers being substantially parallel and substantially vertically oriented.

4. In apparatus as in claim 2, said primary roller having a free cantilever end and a drive end, said motor being operatively connected to said primary roller drive end.

5. In apparatus as in claim 1, an oil retaining reservoir defined on said frame, and conduit means establishing communication between said collection receptacle and said retaining reservoir.

6. In apparatus as in claim 5, vertical adjustment means defined on said frame supporting said rollers, motor and collection receptacle for selective vertical adjustment of said roller, motor and collection receptacle on said frame, said conduit means including telescoping conduit members defined on said receptacle and said reservoir maintaining communication between said receptacle and reservoir at all positions of said adjustment means.

7. In apparatus as in claim 1, said endless belt including a reversing loop at its lowermost position, a weight roller supported within said loop having a substantially horizontal axis of rotation said belt twisting intermediate said primary roller and said weight roller.

8. In apparatus as in claim 1, a pair of pressure rollers rotatably mounted on said frame, said pressure rollers having substantially parallel axes of rotation parallel to the axis of said primary roller and being located upon opposite sides of said primary roller whereby said pressure rollers maintain said belt first side in engagement with approximately one half of the circumference of said primary roller.

9. In apparatus as in claim 8, spring means biasing said pressure rollers toward each other and said primary roller, and lock means locking said pressure rollers in a primary roller access position spaced from said primary roller.

10. In apparatus as in claim 8, gears defined on said primary and pressure rollers, said pressure roller gear meshing with said primary roller gear whereby all said rollers are geared together for simultaneous rotation.

11. Apparatus for removing oil from the horizontal surface of a body of liquid comprising, in combination, a frame, a frame housing adjustably mounted on said frame for selective vertical adjustment thereto, a primary roller rotatably mounted on said frame housing having a substantially vertical axis of rotation, a substantially cylindrical circumference and upper and lower ends, an electric motor mounted on said frame housing operatively connected to said primary roller upper end for rotating said primary roller about its axis, an endless flat belt having first and second sides extending about said primary roller and including a loop portion depending below said housing adapted to be submerged in the body of liquid from which oil is to be removed, said belt extending about said primary roller wherein said first side engages said roller circumference, a pressure roller support mounted on said frame housing adjacent said primary roller for movement between first and second positions, at least one substantially cylindrical pressure roller mounted on said support for rotation about a substantially vertical axis, a spring biasing said pressure roller support toward said first position whereby said pressure roller engages said belt second side and forces said belt first side into engagement with said primary roller circumference, movement of said pressure roller support to said second position displacing said pressure roller from adjacent said pressure roller to permit installation and removal of said belt relative to said pressure roller, a collection receptacle mounted on said frame housing below said primary and pressure rollers collecting oil removed from said belt by said rollers and an oil removing conduit in communication with said collection receptacle.

12. In apparatus as in claim 11, said primary roller lower end being free and unsupported to permit belt installation and removal with respect to said primary roller upon said pressure roller support being located at said second position.

13. In apparatus as in claim 11, said endless belt including a reversing loop at its lowermost portion, a weight roller supported within said loop having a substantially horizontal axis of rotation said belt twisting intermediate said primary roller and said weight roller.

14. In apparatus as in claim 11, a pair of pressure rollers rotatably mounted on said pressure roller support, said pressure rollers being located on substantially opposite diametrical locations with respect to said primary roller and said pressure roller support comprising a plurality of linkages supporting said pair of pressure rollers whereby movement of said support between said first and second positions simultaneously positions both pressure rollers relative to said primary roller.

15. In apparatus as in claim 14, gears defined on said primary and pressure rollers, said gears defined on said pressure rollers meshing with said primary roller gear when said pressure roller support is in said first position.

16. In apparatus as in claim 11, a reservoir mounted on said frame, said conduit being in communication with said reservoir.

17. In apparatus as in claim 16, a vertical inlet conduit defined on said reservoir, said oil removing conduit being vertically oriented and telescopingly communicating with said inlet conduit.

* * * * *